Aug. 4, 1936.  G. T. HART, JR  2,049,540

AREA MEASURING MACHINE

Filed July 19, 1935

INVENTOR—
George T. Hart Jr.
By his attorney
Victor Cobb

Patented Aug. 4, 1936

2,049,540

UNITED STATES PATENT OFFICE 2,049,540

AREA MEASURING MACHINE

George T. Hart, Jr., Lynn, Mass., assignor to United Shoe Machinery Corporation, Paterson, N. J., a corporation of New Jersey Application July 19, 1935, Serial No. 32,260

8 Claims. (Cl. 33—123)

This invention relates to machines for measuring the area of sheet material. While the invention is illustrated as embodied in a machine for measuring the area of hides, skins, and pieces of leather, it is to be understood that the invention and various important features thereof may have other applications and uses.

It is an object of this invention to provide for the measurement of the area of sheet material of irregular outline through the utilization of a flat sheet or sheets of a photo-electrically sensitive substance constructed and arranged to be responsive to a silhouette shadow of the article to be measured. It is a further object of the invention to provide an arrangement wherein a photo-electrically sensitive substance may be utilized in a construction of the simplest type and in which there is provided an indicating means actuated directly from the sheet or sheets of photo-electrically sensitive substance.

To these ends and in accordance with an important feature of the invention there is provided a photo-electrically sensitive substance spread out in a sheet or sheets, the over-all dimensions of which are substantially greater than those of the largest piece of work which it is desired to measure, and a work support of transparent material located between a source of light and said sheet or sheets of photo-electrically sensitive substance so that there is cast upon the said sensitive surface a silhouette shadow of a piece of work on the support. The photo-electrically sensitive surface possesses a property such that, upon illumination thereof, an electric current passes in a circuit comprising the sheet or sheets of photo-electrically sensitive substance and a suitable indicating means electrically connected directly to the sheet or sheets of photo-electrically sensitive substance. Furthermore, the current is proportional to the illumination which reaches the sheet or sheets of photo-electrically sensitive substance. Hence through suitable calibration the said indicating means may be made to indicate the areas of successive pieces of work placed on said work support. It will be understood that each piece of work affects the photo-electrically sensitive sheet material directly without the interposition of any other element, such as a lens, thus simplifying to a marked degree the structure of the measuring machine.

In the illustrated construction, the photo-electrically sensitive surface is made up of a plurality of plates or flat cells each comprising a sheet of an electrically conductive substance such, for instance, as iron, and a layer or sheet of photo-electrically sensitive material, such as selenium, there being a barrier or insulation plane between the iron and selenium and a difference of electrical potential between the oppositely facing surfaces of the two metallic sheets or layers when illuminated, which potential produces a current through an external circuit, the value of which may be indicated by a milliammeter placed in the said circuit.

In the present state of the art, the plates or flat cells are not likely to be uniform in current output. Hence, resistances may be provided with cells of high output to equalize the output of such cells with that of less sensitive cells, all the cells being connected in parallel. In such a construction, a surface of a size to measure hides and skins is provided by a suitable number of such plates or flat cells, and said surface reacts to illumination in a substantially uniform manner so that the effect of variations in the size of the pieces of work is recorded promptly in the meter, whereby measurements can be made as rapidly as one piece of work may be substituted for another on a work support located between the source of light and said sheet of photo-electrically sensitive material.

In the illustrated construction, a resistance is provided in the circuit between the combined sheets of photo-electrically sensitive material and the meter, a manually operable member being also provided in a place readily accessible to the operator to vary the resistance in said circuit so that the meter may be readily set at zero and/or in proper relation to a standard test sheet by which the meter may be calibrated with respect to standard test sheets of different areas.

These and other important features of the invention and novel combinations of parts will now be described in detail in the specification and then pointed out more particularly in the appended claims.

Figure 1:
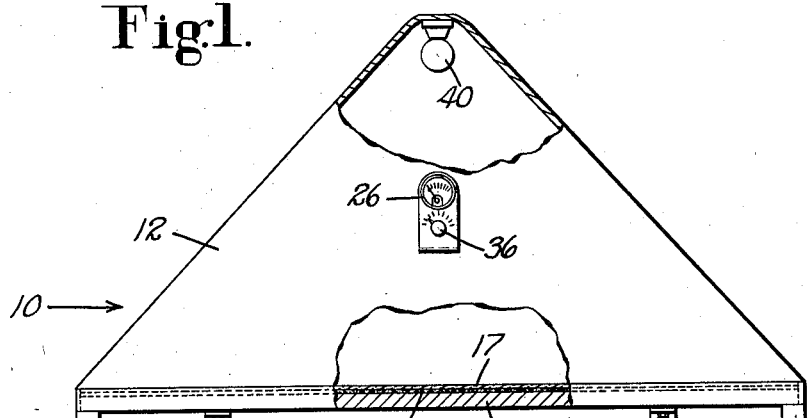
Fig. 1 is a view in front elevation partly in section of a cabinet illustrating one embodiment of the invention.

In the illustrated embodiment of the invention, which is particularly designed for use in the measurement of hides, skins, and leather, there is provided a cabinet 10 in which a cover 12 is hinged at 14 to a table 15.

Upon the table 15 there is placed a sheet of insulation 15a and then a sheet of metal 16 and one of glass 17 which are substantially coextensive with respect to said table, the sheet of glass serving as a transparent work support. The metal member 16 is conveniently made up of small squares or plates 18 of iron, one surface of which has been coated with selenium, a substance which is photo-electrically sensitive so that upon exposure to light an electric current will flow through a wire connecting the coating and the iron plate. However, a special copper plate may be used instead of the selenium-iron combination. In case iron is used, a coating is formed on one surface thereof by spattering selenium thereover in a thin layer intimately connected to the iron. In the case of copper, the latter is heated in an atmosphere of oxygen to form a layer of cuprous oxide on one surface.

Figure 2:
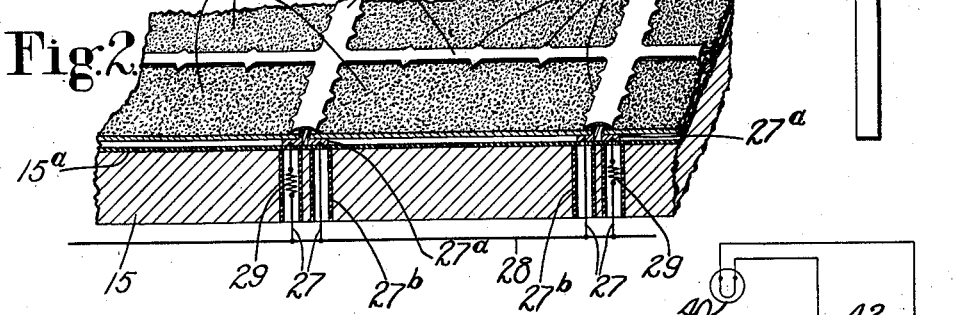
Fig. 2 is an enlarged detail perspective view of a portion of a photo-electrically sensitive plate.

As stated, the sheet 16 is composed of plates or flat cells 18 (Fig. 2) placed side by side in close juxtaposition but insulated from each other, as by felt or paper, each section 18 being surrounded on its exposed surface by a narrow strip of copper 20 which may be secured in place by any means which is insulated from the metal backing of the plate 18. This narrow copper strip has fine prongs or points 22 resting upon the selenium surface of the plate 18 and through said copper strips the plates or cells are connected in parallel to a suitable meter. For purposes of illustration, a number of plates 18 are diagrammatically represented in Fig. 5 as connected by a wire 24 to a milliammeter 26 while the metal backings of the plates 18 are connected by individual wires 27 to a buss wire 28 leading to the other terminal of the milliammeter 26. As shown in Fig. 2, the wires 27 are connected to contact strips 27a located around the periphery of the cells 18 on the under surface thereof, the wires 27 passing through insulating bushings 27b to the buss wire 28.

There is in effect a barrier or insulation plane between the iron and its selenium coated surface (alternatively, between the copper and its cuprous oxide surface) which accounts for the fact that the light-sensitive surface becomes one (the negative) terminal and the metal body becomes the other (positive) terminal of an electronic cell in which no chemical or visible physical change takes place during illumination of the sensitive surface. The total current generated in the plate or flat cell 18 is a function of the illumination and is proportional to it.

Figure 5:
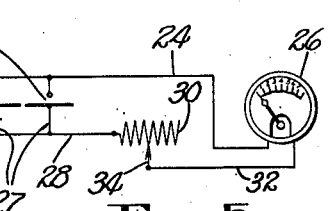
Fig. 5 is a view illustrating diagrammatically the circuit of the photo-electrically sensitive substance, which circuit includes an indicator.

Since the plates as now manufactured are likely to vary considerably from each other in quality, there is conveniently provided, in connection with the wires 27 of high output cells or plates 18, an external resistance as indicated at 29 in Figs. 2 and 5, which in any case is small in comparison with the high internal resistance in each cell or plate 18, but is sufficient and suitably adjusted to each such high output cell to make it substantially the equivalent of less sensitive cells, whereby the whole sheet of plates or cells will be rendered substantially uniform throughout. It will be understood that the cells may be made uniform by spotting those of high output with a covering substance which will exclude the light from the portions of the cells thus covered, thereby reducing the cell output proportionately. Instead of spotting the high output cell, the spots of opaque substance may be spotted on the under side of that portion of the glass work support which covers said cell.

Figure 3:
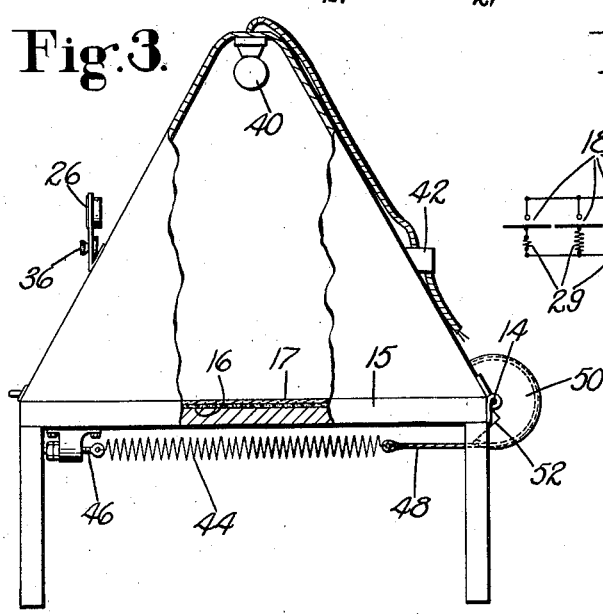
Fig. 3 is a view in side elevation and partly in section of the cabinet shown in Fig. 1.

A resistance 30 of variable length is conveniently provided in the wire 28 so as to make possible calibration of the milliammeter 26. As shown, the resistance 30 (Fig. 5) is connected to the milliammeter 26 through a wire 32 having a contact 34 in slidable relation to resistance 30 so that the length of the resistance 30 in the circuit may be varied. In order to place the adjustment of the resistance under the manual control of the operator the position of the contact member 34 is adjustable through a manually rotatable member 36 positioned adjacent to the milliammeter 26 (Figs. 1 and 3). By proper manipulation of the handle 36, resulting in adjustment of the resistance 30, it is possible to adjust the milliammeter so that the pointer thereof will rest upon the zero point of the scale when no work is in place in the cabinet 12. The scale of the milliammeter is produced by marking thereon the sizes of various test sheets introduced into the cabinet 12 while the apparatus is in working order, and then indicating properly the subdivisions between zero and the points established with the aid of said test sheets. In explanation, it may be stated that the magnet, coil, and pointer of the milliammeter are so constructed and arranged that the pointer swings to the left (instead of to the right which is the common arrangement) over the scale of the milliammeter as the current increases. Hence, upon full exposure of the sensitive sheet 16 to a given illumination, the pointer moves to the left to a point indicating the maximum current which will pass through the milliammeter under the conditions given. This point will be marked zero on the scale since no work is present between the source of light 40 and the sheet 16. If now, a test sheet of five square feet be placed on the glass 17, the pointer will turn to the right because less current is flowing through the milliammeter. Since the current in the external circuit is proportional to the surface exposed, the reduction in current will correspond to the area of the test sheet which as stated is five square feet. Thus, the point 5 is established on the scale. A test sheet of ten square feet placed over the sheet 16 would establish the point 10 on the scale. A number of test sheets of different sizes, five or more, will preferably be used in establishing the scale over which the pointer of the milliammeter will move to indicate in units of area the measurements of successive pieces of work.

Figure 4:
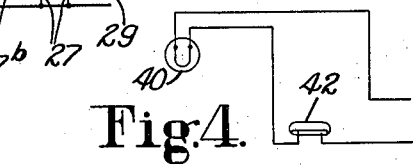
Fig. 4 is a diagrammatic representation of a lamp circuit.

In the top part of the cabinet 10 there is provided a source of artificial light in the form of a lamp 40. If desired this lamp 40 may be controlled by a switch so that when the cover 12 of the cabinet is lifted to change pieces of work the lamp will be de-energized or disconnected from its circuit. This may conveniently be accomplished by providing a mercury switch indicated at 42 in Fig. 4 of the drawing, the circuit of the lamp 40 being re-established when the cover 12 is returned to its operative position.

To assist in operating the cover 12 and to hold it in its upper or uncovered position there are provided a plurality of spring members 44 (Fig. 3) each connected at one end to an adjusting member 46 and at its other end to a cable or cord 48 disposed upon the cylindrical surface of a disk 50 supported at its center upon the hinge member 14 and secured to the said cover 12 (Fig. 3). It is clear that the springs 44 will assist in raising the cover 12 and in retarding its return to the covering position shown in Figs. 1 and 3. If desired, each disk 50 may have a cutaway part to provide a shoulder at 52 to act as a stop to limit the extent of opening of the cover 12.

In measuring operations upon pieces of work, the cover 12 is lifted to introduce a piece of work upon the plate of glass 17. After the piece of work has been spread out in extended condition the cover 12 is replaced and a reading is taken from the milliammeter 26, it being understood that the milliammeter has been calibrated to indicate the area of the piece of work in units of area measurement. Since the current flowing through the milliammeter is directly proportional to the surface exposed to light from the lamp 40, each piece of work varies this current directly in accordance with its area interposed between the lamp and the sensitive surfaces of the plates or cells 18. Since several factors may affect the current passing through the milliammeter from the cells 18, as for instance, the condition of the lamp 40, the milliammeter 26 should be calibrated at least once a day through the use of test sheets and proper adjustment of the resistance 30 in the milliammeter circuit.

Having described my invention, what I claim as new and desire to secure by Letters Patent of the United States is:

1. In a machine for measuring the area of pieces of work of irregular contour, a source of light, a metallic sheet having a photo-electrically sensitive surface, said sheet being substantially larger than the pieces of work to be measured, a work support of transparent material for supporting pieces of work between the source of light and said photo-electrically sensitive surface, and a meter calibrated to measure in units of area and electrically connected directly to said photo-electrically sensitive surface to indicate the areas of successive pieces of work.

2. In a machine for measuring the area of pieces of work of irregular contour, a source of light, a sheet of material having a photo-electrically sensitive surface and also an electrically conductive surface, there being a barrier or insulation plane between said surfaces, a work support of transparent material for supporting a piece of work between said source of light and said photo-electrically sensitive surface, and a meter electrically connected to both of said surfaces and calibrated to indicate in units of area the measurements of successive pieces of work.

3. In a machine for measuring hides, skins, and leather, a source of light, a plurality of plates or flat cells placed side by side and each having a photo-electrically sensitive surface and also an electrically conductive surface back to back with respect to each other, said plates or cells being insulated from each other and together providing a photo-electrically sensitive surface of a size substantially greater than the pieces of work to be measured, and said plates or cells being connected in parallel, a work support of transparent material adapted to support pieces of work between the source of light and the photo-electrically sensitive surface so that the piece of work casts a silhouette shadow on said sensitive surface, and a meter electrically connected to said plates or cells and calibrated to indicate in units of area the measurements of successive pieces of work.

4. In a machine for measuring hides, skins, and leather, a source of light, a series of plates or flat cells, each having a photo-electrically sensitive surface, placed side by side and constructed and arranged to have substantially uniform electrical output per unit of area with a given illumination, said plates or cells being insulated from each other and together providing a photo-electrically sensitive surface of a size substantially greater than the pieces of work to be measured, and said plates or cells being connected in parallel, a work support of transparent material adapted to support pieces of work in spaced relation to said photo-electrically sensitive surface so that the piece of work casts a silhouette shadow on said photo-electrically sensitive surface, and a meter electrically connected to said plates or cells and calibrated to indicate in units of area the measurements of successive pieces of work.

5. In a machine for measuring hides, skins, and leather, a source of light, a series of plates or flat cells each having a photo-electrically sensitive surface and disposed side by side in a plane to provide a surface of a size substantially larger than the pieces of work to be measured, each of said cells generating a current of electricity upon exposure to light, means to equalize the output from said plates or cells per unit of area with a given illumination, said cells being connected in parallel, a sheet of transparent material covering the photo-electrically sensitive surface of said cells to serve as a work support, so that each piece of work casts a silhouette shadow on said sensitive surface, and a meter connected to said cells and calibrated to indicate in units of area the measurements of successive pieces of work.

6. In a machine for measuring hides, skins, and leather, a source of light, a plurality of plates or flat cells each having a photo-electrically sensitive surface and disposed side by side in a plane to provide a surface of a size substantially larger than the pieces of work to be measured, each of said cells generating a current of electricity upon exposure to light and some of the cells being of higher output than others, suitable resistances being provided in connection with the higher output cells to equalize them with cells of lower output, and said cells being connected in parallel, a sheet of transparent material covering the photo-electrically sensitive surface of said cells and in spaced relation thereto, said sheet of transparent material serving as a work support between the source of light and the photo-electrically sensitive surface so that each piece of work casts a silhouette shadow on said sensitive surface of substantially the same area as the work piece itself, and a meter connected to said cells and calibrated to indicate in units of area the measurements of successive pieces of work.

7. In an area measuring machine, a lamp serving as a source of light, a sheet having a photo-electrically sensitive surface, said sheet being substantially larger than the pieces of work to be measured, a work support for supporting pieces of work between the lamp and said photo-electrically sensitive surface, a meter calibrated to measure in units of area and connected to said photo-electrically sensitive surface to indicate the areas of successive pieces of work, a hood movably mounted on the work support to cover the piece of work during the measuring operation, said lamp being mounted within the hood, and means to interrupt the circuit of said lamp when the hood is raised to introduce or withdraw pieces of work.

8. In an area measuring machine, a lamp serving as a source of light, a sheet of material having a photo-electrically sensitive surface and also an electrically conductive surface insulated from the first-mentioned surface, a work support for supporting a piece of work between said source of light and said photo-electrically sensitive surface, a meter calibrated to measure in units of area and connected to both of said surfaces to indicate the areas of successive pieces of work, a hood movably mounted on the work support to cover the piece of work during the measuring operation, said lamp being mounted within the hood, and a switch in the circuit of said lamp arranged to break the circuit when the hood is raised to introduce or remove pieces of work.

GEORGE T. HART, Jr.